United States Patent
Suematsu

(10) Patent No.: US 8,790,834 B2
(45) Date of Patent: Jul. 29, 2014

(54) FUEL CELL SYSTEM AND METHOD FOR CONTROLLING THE FUEL CELL SYSTEM

(75) Inventor: Keigo Suematsu, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 944 days.

(21) Appl. No.: 12/595,129

(22) PCT Filed: Apr. 11, 2008

(86) PCT No.: PCT/IB2008/000882
§ 371 (c)(1),
(2), (4) Date: Oct. 8, 2009

(87) PCT Pub. No.: WO2008/125953
PCT Pub. Date: Oct. 23, 2008

(65) Prior Publication Data
US 2010/0068569 A1  Mar. 18, 2010

(30) Foreign Application Priority Data
Apr. 12, 2007  (JP) .................................. 2007-105046

(51) Int. Cl.
*H01M 8/06* (2006.01)

(52) U.S. Cl.
USPC ............ 429/414; 429/412; 429/415; 429/420

(58) Field of Classification Search
USPC ................................. 429/412, 420, 414, 415
See application file for complete search history.

(56) References Cited

U.S. PATENT DOCUMENTS

| | | | |
|---|---|---|---|
| 2004/0038114 A1* | 2/2004 | Wariishi et al. | 429/38 |
| 2004/0115491 A1 | 6/2004 | Cargnelli et al. | |
| 2005/0147853 A1* | 7/2005 | Kaufmann et al. | 429/13 |
| 2005/0147863 A1 | 7/2005 | Hiramatsu et al. | |
| 2008/0160363 A1* | 7/2008 | Tsukada | 429/19 |

FOREIGN PATENT DOCUMENTS

| | | |
|---|---|---|
| EP | 1 187 241 A | 3/2002 |
| EP | 1 463 136 A | 9/2004 |
| EP | 1 469 546 A2 | 10/2004 |
| JP | 8-500931 | 1/1996 |
| JP | 2005-19331 | 1/2005 |
| JP | 2005-32652 | 2/2005 |

(Continued)

OTHER PUBLICATIONS

Notification of Reason(s) for Refusal for JP Appl. No. 2007-105046 dated Jul. 3, 2012.

*Primary Examiner* — Nicholas P D'Aniello
(74) *Attorney, Agent, or Firm* — Finnegan, Henderson, Farabow, Garrett & Dunner, LLP

(57) ABSTRACT

A gas-supply passage (6) via which anode gas is supplied to a fuel cell unit (2) and a gas-discharge passage (12) via which anode gas is discharged from the fuel cell unit (2) are connected via a communication passage (30). Circulation pump (32) switches the communication state of the communication passage between a closed state and an opened state. Circulation pump (32) causes a gas flow from the gas-discharge passage to the gas-supply passage when the communication passage (30) is in the opened state. The communication passage (30) is normally closed, and it is opened when a predetermined condition related to the operation state of the fuel cell unit (2) is satisfied.

17 Claims, 8 Drawing Sheets

(56) References Cited

FOREIGN PATENT DOCUMENTS

| JP | 2005-166498 | 6/2005 |
|---|---|---|
| JP | 2005-302451 | 10/2005 |
| JP | 2005-310414 | 11/2005 |
| JP | 2006-147150 | 6/2006 |
| JP | 2007-42452 | 2/2007 |
| WO | WO 99/05741 | 2/1999 |
| WO | WO 03/006366 A1 | 1/2003 |
| WO | WO 03/065485 A | 8/2003 |
| WO | WO 2004/027912 A | 4/2004 |
| WO | WO 2006/012953 A | 2/2006 |
| WO | WO 2007/018312 | 2/2007 |

* cited by examiner

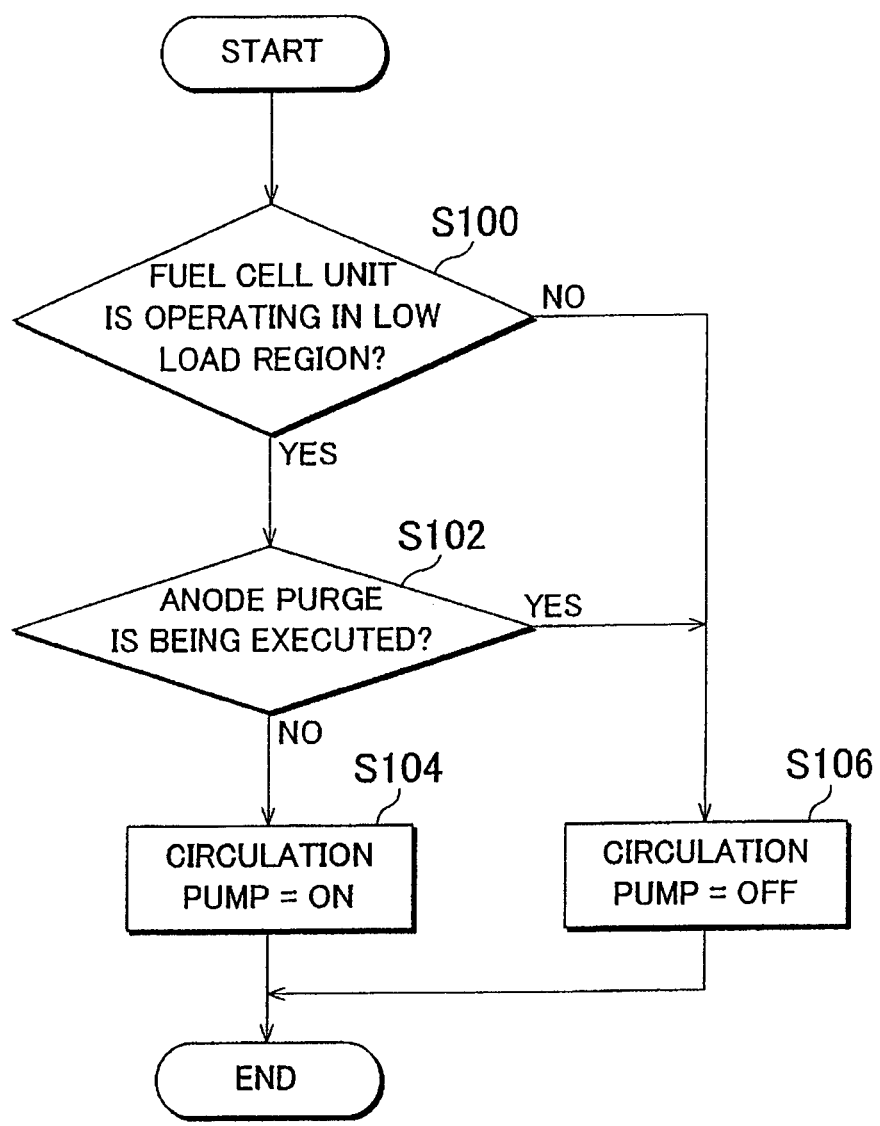

FUEL CELL SYSTEM AND METHOD FOR CONTROLLING THE FUEL CELL SYSTEM

CROSS-REFERENCE TO RELATED APPLICATIONS

This application is a national phase application of International Application No. PCT/IB2008/000882, filed Apr. 11, 2008, and claims the priority of Japanese Application No. 2007-105046, filed Apr. 12, 2007, the contents of both of which are incorporated herein by reference.

FIELD OF THE INVENTION

The invention relates to a fuel cell system, and more particularly to a fuel cell system that operates with anode gas retained in each fuel cell or while continuously expelling anode-off gas from a closed anode-gas passage at a very low rate. The invention also relates to a method for controlling such fuel cell systems.

BACKGROUND OF THE INVENTION

For example, Published Japanese Translation of PCT Application No. 08-500931 (JP-T-08-500931), Japanese Patent Application Publications No. 2005-32652 (2-A-2005-32652), No. 2005-19331 (JP-A-2005-19331), and No. 2005-166498 (JP-A-2005-166498) describe fuel cell systems (circulation-type fuel cell systems) in which anode-off gas, which is anode gas that has been used in the fuel cells, is recirculated to utilize any unreacted hydrogen that remains in the anode-off gas. In such circulation type fuel cell systems, nitrogen that enters the anode through the electrolyte membrane of each fuel cell is also circulated together with the anode gas, and this nitrogen accumulates in the circulation passage of the anode gas during the operation of the fuel cell system. Accordingly, a discharge valve is provided to facilitate the expulsion of nitrogen from the circulation passage. Thus, by controlling this discharge valve appropriately, nitrogen that has accumulated in the circulation passage may be expelled, so that the hydrogen concentration in the anode gas supplied to the fuel cells is recovered.

However, because nitrogen is evenly dispersed in the anode gas in the circulation passage, if the discharge valve is operated to expel a large amount of nitrogen, a large amount of hydrogen will also be expelled together with nitrogen. Even if the power generation efficiency of the fuel cell system is increased by reducing the nitrogen concentration in the anode gas, the waste of hydrogen immediately leads to a decrease in the fuel economy of the entire system. As such, there is a limit to the extent to which the nitrogen concentration in the anode gas can be reduced, and thus such improvement of the power generation efficiency is limited.

Meanwhile, there are circulation-type fuel cell systems in which power is generated at each fuel cell using anode gas retained in the fuel cell and additional anode gas is supplied to the fuel cell to replenish the anode gas used for the power generation (dead-end type fuel cell systems). Further, fuel cell systems have been under development in which power is generated at each fuel cell while expelling anode-off gas from a closed anode-gas passage at a very low rate ("continuous low-rate discharge type fuel cell systems").

In the dead-end type fuel cell systems and the continuous low-rate discharge type fuel cell systems, too, nitrogen enters the anode through the electrolyte membrane in each fuel cell, as in the circulation type fuel cell systems. However, in the dead-end type fuel cell systems and the continuous low-rate discharge type fuel cell systems, the nitrogen that has entered the anode through the electrolyte membrane is not dispersed uniformly, instead; the nitrogen accumulates in the downstream side of the anode. Thus, in dead-end type fuel cell systems, if the discharge valve is opened after a sufficient amount of nitrogen has accumulated in the downstream portion of the anode, a large amount of nitrogen is expelled at one time without wasting hydrogen. Meanwhile, in continuous low-rate discharge type fuel cell systems, the nitrogen that accumulates on the downstream portion of the anode may be discharged little by little from the closed anode-gas passage. As such, in dead-end type fuel cell systems and continuous low-rate discharge type fuel cell systems, the concentration of nitrogen in the anode gas may be kept low, and therefore a high power generation efficiency can be achieved.

The electrolyte membrane of each fuel cell requires water molecules to enable hydrogen ions to move therein, and thus the electrolyte membrane exhibits a high hydrogen-ion-conductivity only when it is sufficiently moist. For this reason, if the electrolyte membrane is insufficiently hydrated due to a shortage of moisture in the fuel cell, the conductivity decreases, which significantly reduces the power generation performance of the fuel cell. Thus, in order to maintain a high power generation performance, it is important to keep the inside of each fuel cell sufficiently moist.

At the cathode side of each fuel cell, water is produced by hydrogen ions that have moved from the anode through the electrolyte membrane and oxygen in the cathode gas, and a portion of this water moves to the anode through the electrolyte membrane. Therefore, if this water can be dispersed throughout the anode, the entire portion of the anode may be hydrated to a moderate degree.

If there is a flow of anode gas in the anode-gas passage in each fuel cell, the anode gas flow carries water, so that it is dispersed throughout the anode. However, in the case of the dead-end type fuel cell systems and the continuous low-rate-discharge type fuel cell systems described above, the flow of anode gas in the anode-gas passage is very weak, in particular, there is substantially no gas flow at the downstream portion of the anode. Thus, in such fuel cell systems, water may not be dispersed adequately in the anode of each fuel cell, resulting in the anode being unevenly hydrated. If some portions of the anode of each fuel cell are insufficiently hydrated, anode reactions do not properly occur at said portions of the anode, deteriorating the power generation performance of the fuel cell and adversely affecting the durability of the electrolyte membrane of the fuel cell.

SUMMARY OF THE INVENTION

The invention relates to a technology for a fuel cell system that operates with anode gas retained in each fuel or while expelling anode-off gas from a closed anode gas passage at a very low rate that prevents deterioration of the power generation performance of the fuel cell system and reduction of the durability of the electrolyte membrane of each fuel cell, which may be caused by drying of the anode of each fuel cell.

The first aspect of the invention relates to a fuel cell system having a fuel cell, a gas-supply passage via which anode gas is supplied to the fuel cell, and a gas-discharge passage via which anode gas is discharged from the fuel cell, the ends of the gas-discharge passage being substantially closed. The fuel cell system has: a communication passage via which the gas-discharge passage communicates with the gas-supply passage; communication-state switching means for switching the communication state of the communication passage between a closed state and an opened state; gas-flowing means for causing a gas flow from the gas-discharge passage to the gas-supply passage when the communication passage is open; and communication-state controlling means for controlling the switching of the communication state of the communication passage by the communication-state switching means. The communication-state controlling means normally maintains the communication passage in the closed state and opens the communication passage when a predetermined condition related to the operation state of the fuel cell is satisfied.

According to the fuel cell system described above, if the communication passage is open, the anode gas flows from the gas-discharge passage to the gas-supply passage, whereby the anode gas also flows in the fuel cell. As the anode gas thus flows in the fuel cell, water is dispersed throughout the anode of the fuel cell, which prevents partial dehydration of the anode. Further, because the anode gas that has passed through the communication passage is delivered to the fuel cell again, the anode gas is not wasted, and further the water brought away from the fuel cell by the anode gas can be returned to the fuel cell. Further, if the predetermined condition is not satisfied, the communication passage is closed, which is the normal state of the communication passage, so that the fuel cell system resumes operation using anode gas retained in the fuel cell or while expelling the anode-off gas at a very low rate, whereby a high power generation efficiency is achieved.

The fuel cell system described above may be such that: the communication-state controlling means includes an operation-region determining means used to determined whether the load on the fuel cell is lower than a first reference load; and when the load on the fuel cell is lower than the first reference load, the communication-state controlling means determines that the predetermined condition is satisfied and opens the communication passage.

When the fuel cell is operating in a low load region, the amount of water produced at the cathode of the fuel cell is relatively small while the flow rate of the cathode gas relative to the load on fuel cell is relatively high. In this case, therefore, the amount of water that moves to the anode decreases, and it increases the possibility that the anode will be insufficiently hydrated. According to the structure described above, however, because the anode gas is circulated when the fuel cell is operating in a low load region, water is dispersed throughout the anode together with the anode gas, whereby respective portions of the anode can be prevented from becoming insufficiently hydrated.

Further, the fuel cell system described above may be such that: the communication-state controlling means includes hydration-degree determining means for measuring or calculating a physical quantity related to the degree of hydration of an anode of the fuel cell and determining whether the measured or calculated physical quantity indicates that the degree of hydration of the anode is below a reference value; and the communication-state controlling means opens the communication passage if the measured or calculated physical quantity indicates that the degree of hydration of the anode is below the reference value.

According to the structure described above, if it is determined that the anode is insufficiently hydrated, the anode gas is circulated, whereby water is dispersed throughout the anode by the anode gas flow.

In the fuel cell system described above, the physical quantity that is measured may be the rate of decrease in the voltage of the fuel cell, and the hydration-degree determining means may include means for measuring the rate of decrease in the voltage of the fuel cell.

In this case, whether the anode is sufficiently hydrated may can be accurately determined by referring to the rate of decrease in the voltage of the fuel cell.

In the fuel cell system described above, the physical quantity that is measured may be the humidity of the anode gas in the gas-discharge passage further, and the hydration-degree determining means may include means for measuring the humidity of the anode gas in the gas-discharge passage.

In this case, whether the anode is sufficiently hydrated can be accurately determined by referring to the humidity of the anode gas in the gas-discharge passage.

In the fuel cell system described above, the physical quantity that is measured may be the voltage difference between the inlet side and outlet side of the anode, and the hydration-degree determining means may include means for measuring the voltage difference.

In this case, whether the anode has been dried can be accurately determined by referring to the difference between the voltage at the inlet side of the anode of the fuel cell and the voltage at the outlet side of the anode of the fuel cell.

In the fuel cell system described above, the physical quantity that is measured may be the operating temperature of the fuel cell, and the hydration-degree determining means may include means for measuring the operating temperature of the fuel cell.

In this case, whether the anode is sufficiently hydrated may be accurately determined by taking the operating temperature of the fuel cell into consideration.

In the fuel cell system described above, further, the fuel cell may be structured such that the gas flow direction at the anode of the fuel cell and the gas flow direction at a cathode of the fuel cell are opposite to each other.

According to the structure described above, because the gas flow direction at the anode of the fuel cell and the gas flow direction at the cathode of the fuel cell are opposite to each other, the water that has moved from the cathode to the anode through the electrolyte membrane is dispersed throughout the anode efficiently.

The fuel cell system described above may further include a gas-discharge valve, provided in the gas-discharge passage, to interrupt or limit a communication between the upstream side and the downstream side of the gas-discharge valve and may be such that the communication-state controlling means maintains the communication passage in the closed state or limits the gas flow in the communication passage when the gas-discharge valve is not interrupting nor limiting the communication between the upstream side and the downstream side of the gas-discharge valve.

According to the structure described above, because the circulation of the anode gas is prohibited or limited when the nitrogen accumulating in the anode is expelled by opening the gas-discharge valve, it is possible to prevent a decrease in the efficiency in expelling nitrogen, which may be caused when the nitrogen concentration is uniform due to the circulation of the anode gas.

The fuel cell system described above may further include anode-gas pressure controlling means for making the pressure of anode gas supplied to the fuel cell lower when the communication passage is in the opened state than when the communication passage is in the closed state.

According to the structure described above, because the pressure of the anode gas is reduced when circulating the anode gas, the flow rate of the anode gas in the fuel cell increases, which facilitates dispersion of water in the anode.

The fuel cell system described above may further include coolant flow-rate controlling means for controlling the flow rate of the coolant such that the temperature at the outlet side of the anode is lower than that at the inlet side of the anode by a larger amount when the communication passage is open than when the communication passage is in the closed state.

According to the structure described above, the humidity at the inlet side of the anode is reduced, which helps the anode gas bring water away, and the humidity at the outlet side of the anode is increased, which helps moisten the outlet side of the anode that tends to be dried easily.

The fuel cell system described above may be such that: the communication-state controlling means includes operation-region determining means for determining whether the load on the fuel cell is higher than a second reference load; and if the load on the fuel cell is presently higher than the second reference load, the communication-state controlling means determines that the predetermined condition has been satisfied and opens the communication passage.

If the fuel cell operates under a high load without circulating the anode gas, anode gas deficiencies occur at some portions in the downstream side of the anode gas passage, which may degrade the catalysts at said portions. According to the structure described above, however, the anode gas is circulated also when the load on the fuel cell unit is high, nitrogen accumulated in the anode gas passage in the fuel cell is dispersed, whereby local anode gas deficiencies are prevented.

The second aspect of the invention relates to a method for controlling a fuel cell system. This method includes the steps of: determining the operation state of a fuel cell; circulating anode gas discharged from an anode-gas discharge passage back to an anode-gas supply passage by opening a communication passage, via which the anode-gas discharge passage communicates with the anode-gas supply passage, when a predetermined condition related to the operation state of the fuel cell is satisfied; and closing the communication passage if the predetermined condition is not satisfied.

The third aspect of the invention relates to a fuel cell system having: a fuel cell; a gas-supply passage via which anode gas is supplied to the fuel cell; a gas-discharge passage via which anode gas is discharged from the fuel cell, the ends of the gas-discharge passage being substantially closed; a communication passage via which the gas-discharge passage communicates with the gas-supply passage; an interrupting device provided in the communication passage and operable to interrupt the flow of anode gas; and a controller that: normally maintains the communication passage in a closed state using the interrupting device; determines whether a predetermined condition related to the operation state of the fuel cell is satisfied; and controls, if the predetermined condition is satisfied, the interrupting device to open the communication passage.

The fourth aspect of the invention relates to a fuel cell system having: a fuel cell; a gas-supply passage via which anode gas is supplied to the fuel cell; a gas-discharge passage via which anode gas is discharged from the fuel cell, the ends of the gas-discharge passage being substantially closed; a communication passage via which the gas-discharge passage communicates with the gas-supply passage; an interrupting device provided at at least one of the communication passage, a converging point between the communication passage and the gas-discharge passage, and a converging point between the communication passage and the gas-supply passage and operable to interrupt the flow of anode gas from the gas-discharge passage to the gas-supply passage; a controller that: determines at least one of whether the power generation state of the fuel cell is abnormal and whether the power generation state of the fuel cell will become abnormal, and controls the interrupting device to allow anode gas to flow from the gas-discharge passage to the gas-supply passage if it is determined that the power generation state of the fuel cell is abnormal or that the power generation state of the fuel cell will become abnormal.

The fifth aspect of the invention relates to a method for controlling a fuel cell system. This method includes the steps of: determining the operation state of a fuel cell; circulating anode gas discharged from an anode-gas discharge passage back to an anode-gas supply passage by opening a communication passage, via which the anode-gas discharge passage communicates with the anode-gas supply passage, when a predetermined condition related to the operation state of the fuel cell is satisfied; determining at least one of whether the power generation state of the fuel cell is abnormal and whether the power generation state of the fuel cell will become abnormal; and allowing anode gas to flow from the gas-discharge passage to the gas-supply passage if it is determined that the power generation state of the fuel cell is abnormal or that the power generation state of the fuel cell will become abnormal.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a flowchart illustrating a control routine that is executed in the fuel cell system of the first example embodiment to turn the circulation pump on and off;

FIG. 10 is a view illustrating how the respective gases and the coolant in each fuel cell when the circulation pump is on.

DETAILED DESCRIPTION OF THE EMBODIMENTS

Figure 1:
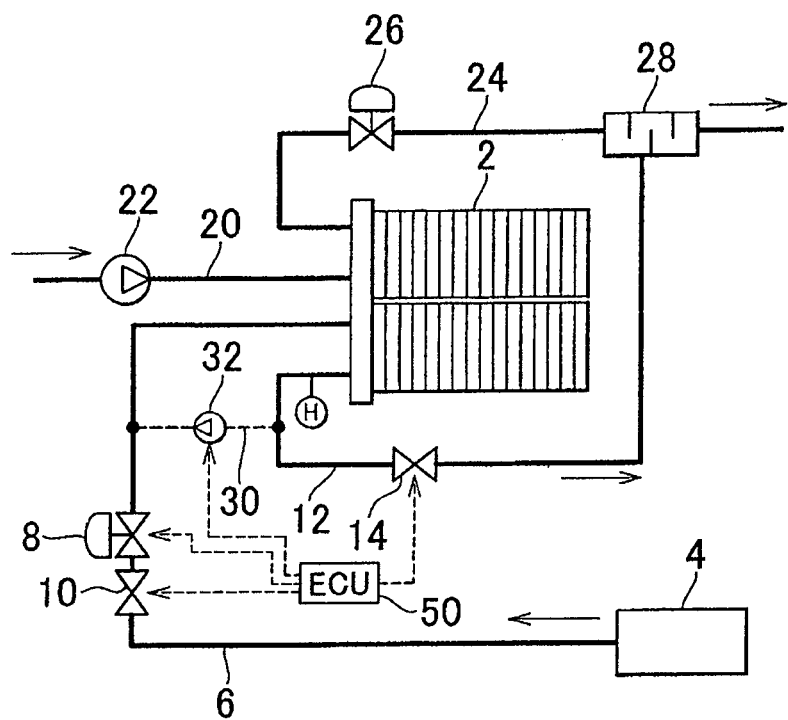
FIG. 1 is a schematic view of the configuration of a fuel cell system according to the first example embodiment of the invention.

FIG. 1 is a schematic view of the configuration of a fuel cell system according to a first embodiment of the invention. The fuel cell system generates electric power using a fuel cell unit 2 and supplies the generated electric power to various electric loads, including a motor. The fuel cell unit 2 is a fuel cell stack constituted of a plurality of fuel cells stacked on top of each other. Each fuel cell is constituted of a membrane-electrode assembly and a pair of collector plates that sandwich the membrane-electrode assembly (not shown). The membrane-electrode assembly is constituted of a solid polymer electrolyte membrane, catalytic electrodes integrally provided on the both sides of the solid polymer electrolyte membrane, and gas diffusion layers formed of carbon sheets, etc., and integrally provided on the both sides of the solid polymer electrolyte membrane. Each collector plates serves also as a separator to partition the adjacent membrane-electrode assemblies. Hydrogen (fuel gas) is supplied to the anode of each fuel cell while air is supplied to the cathode, so that electric power is generated.

An air-supply passage 20 is connected to the fuel cell unit 2 and air is supplied to the fuel cell unit 2 via the air-supply passage 20. An air pump 22 is provided in the air-supply passage 20. When the air pump 22 is driven, air is drawn into the air-supply passage 20 and then supplied to the fuel cell unit 2. The air supplied to the fuel cell unit 2 is distributed to the cathodes of the respective fuel cells via a supply manifold provided in the fuel cell unit 2. The gases that have passed through the cathodes of the respective fuel cells (cathode gas) converge at a gas-discharge manifold provided in the fuel cell unit 2 and then they are discharged to a cathode-gas discharge passage 24. A back-pressure adjustment valve 26 and a diluter 28 are provided in the cathode-gas discharge passage 24. The downstream end of the cathode-gas discharge passage 24 is connected to the diluter 28.

A hydrogen-supply passage 6 is connected to the fuel cell unit 2 and hydrogen is supplied to the fuel cell unit 2 from a hydrogen-supply source 4, which may be a high-pressure hydrogen tank, or the like, via the hydrogen-supply passage 6. A shut valve 10 and a variable pressure adjustment valve 8 are provided in the hydrogen-supply passage 6 in this order from the upstream side. Hydrogen is depressurized to a desired pressure at the variable pressure adjustment valve 8 and then supplied to the fuel cell unit 2. The hydrogen supplied to the fuel cell unit 2 is distributed to the anodes of the respective fuel cells via a supply manifold provided in the fuel cell unit 2. The gases that have passed through the anodes of the respective fuel cells (anode gas) converge at a discharge manifold provided in the fuel cell unit 2 and then they are discharged to an anode-gas discharge passage 12. A discharge valve 14 is provided in the anode-gas discharge passage 12. The discharge valve 14 is normally closed and it is opened only when a predetermined condition (purge condition) has been satisfied.

Further, the fuel cell system of the first example embodiment has a communication passage 30 that connects the anode-gas discharge passage 12 to the hydrogen-supply passage 6. More specifically, the portion of the anode-gas discharge passage 12 upstream of the discharge valve 14 and the portion of the hydrogen-supply passage 6 downstream of the variable pressure adjustment valve 8 are connected to each other via the communication passage 30. A small circulation pump 32 is provided in the communication passage 30. The pumping capacity of the circulation pump 32 is sufficient to send the anode gas from the anode-gas discharge passage 12 to the hydrogen-supply passage 6 against the difference between the gas pressure in the hydrogen-supply passage 6 and the gas pressure in the anode-gas discharge passage 12. An ECU 50 controls the variable pressure adjustment valve 8, the shut valve 10, the discharge valve 14, and the circulation pump 32. The circulation pump 32 serves as "gas-flowing means" for causing a gas flow from the anode-gas discharge passage side to the hydrogen-supply passage side when the communication passage 30 is open, as well as "communication-state switching means" for switching the state of the communication passage 30 between the closed state and the open state. The circulation pump 32 is normally stopped and it is driven only when a predetermined condition (drive condition) has been satisfied.

Figure 2A:
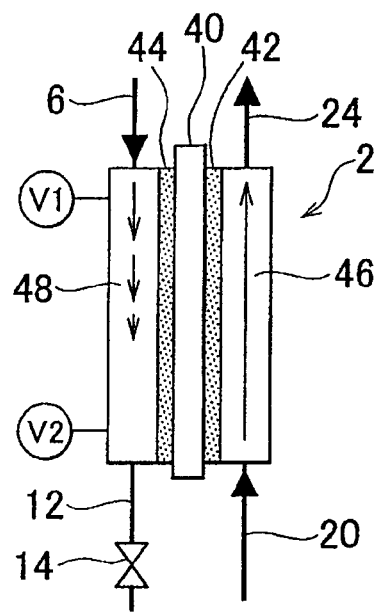
FIG. 2A and FIG. 2B are schematic views of the internal structure of each fuel cell of the fuel cell unit and illustrate gas flows in the fuel cell.
Figure 2B:
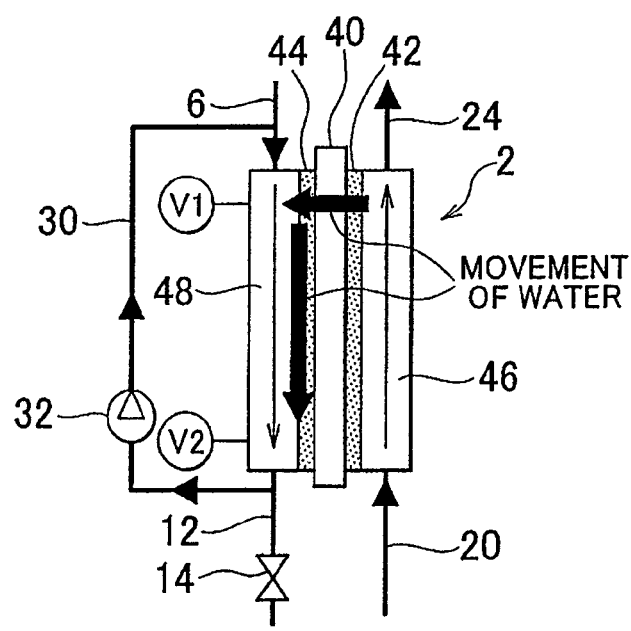

FIG. 2A and FIG. 2B are schematic views of the internal structure of each fuel cell in the fuel cell unit 2 and illustrate the gas flows in each fuel cell. FIG. 2A illustrates how respective gases flow in each fuel cell when the circulation pump 32 is off (in the normal state), and FIG. 2B illustrates how respective gases flow in each fuel cell when the circulation pump 32 is on. Collector plates and manifolds are not shown in these figures. In the following description, references will be made to FIG. 2A and FIG. 2B as well as to FIG. 1.

As is shown in FIG. 2A and FIG. 2B, in each fuel cell, gas passage potions 46, 48 are formed along the respective gas diffusion layers 42, 44 that sandwich the membrane-electrode assembly 40. The gas passage portion 46 serves as a cathode-gas passage portion through which air is supplied to the cathode, and the passage portion 48 serves as an anode-gas passage through which hydrogen is supplied to the anode. Thus, each fuel cell of the fuel cell unit 2 is structured such that the gas in the cathode-gas passage portion 46 and the gas in the anode-gas passage portion 48 flow in opposite directions. The cathode-gas passage portion 46 and the anode-gas passage portion 48 may be formed in any shape and may have any structure as long as the gas in the cathode-gas passage portion 46 and the gas in the anode-gas passage portion 48 flow in the opposite directions. For example, grooves may be formed in the surfaces of the respective collector plates (separators) and used as the cathode-gas passage portion 46 and the gas in the anode-gas passage portion 48, respectively. Alternatively, porous layers made of conductive materials may be provided between the collector plates and the membrane-electrode assembly 40 and used as the gas passage portions 46, 48.

Referring to FIG. 2A, when the circulation pump 32 is off (in the normal state), the anode gas stays in the anode-gas passage portion 48 as long as the discharge valve 14 is closed. During this operation (will be referred to as "anode-dead-end operation" where appropriate), the hydrogen supplied to the fuel cell unit 2 is effectively used.

During the anode-dead-end operation described above, however, almost no gas flows, especially, in the downstream side of the anode-gas passage portion 48. A portion of the water produced through the power generation reactions enters the anode-gas passage portion 48 from the cathode-gas passage portion 46 through the inside of the membrane-electrode assembly 40. However, when the gas flow in the anode-gas passage portion 48 is weak, water is not dispersed throughout the anode of the membrane-electrode assembly 40, resulting in the anode being unevenly hydrated.

Referring to FIG. 2B, on the other hand, when the circulation pump 32 is on, the communication passage 30 is open and thus the anode gas flows from the anode-gas discharge passage 12 to the hydrogen-supply passage 6. In this state, the anode gas also flows in the anode-gas passage portion 48 of each fuel cell, and this anode gas flow disperses the water as shown in FIG. 2B. A relatively large amount of water moves from the downstream portion of the cathode-gas passage portion 46 to the anode-gas passage portion 48. Therefore if the each fuel cell is structured such that the anode gas and the cathode gas flow in the opposite directions, the water that has entered the anode-gas passage portion 48 from the cathode-gas passage portion 46 is efficiently dispersed throughout the entire region of the anode-gas passage portion 48.

As such, when the circulation pump 32 is off, the anode-dead-end operation is performed which enables the fuel cell to operate efficiently, as described above. Further, when the circulation pump 32 is on, the anode gas is made to flow in the anode-gas passage portion 48, whereby the water is dispersed throughout the anode, preventing partial drying of the anode. By turning the circulation pump 32 on and off appropriately, the anode-dead-end operation, which provides a high power generation efficiency as mentioned earlier, may be continued while preventing drying of the anode of each fuel cell, which may otherwise lead to deterioration of the power generation performance of the fuel cell system. In the following, a method for controlling the circulation pump 32 will be described in detail with reference to FIG. 3. FIG. 3 is a flowchart illustrating a control routine that is executed in the fuel cell system of the first example embodiment to turn the circulation pump 32 on and off. The control routine is executed by the ECU 50.

Figure 4:
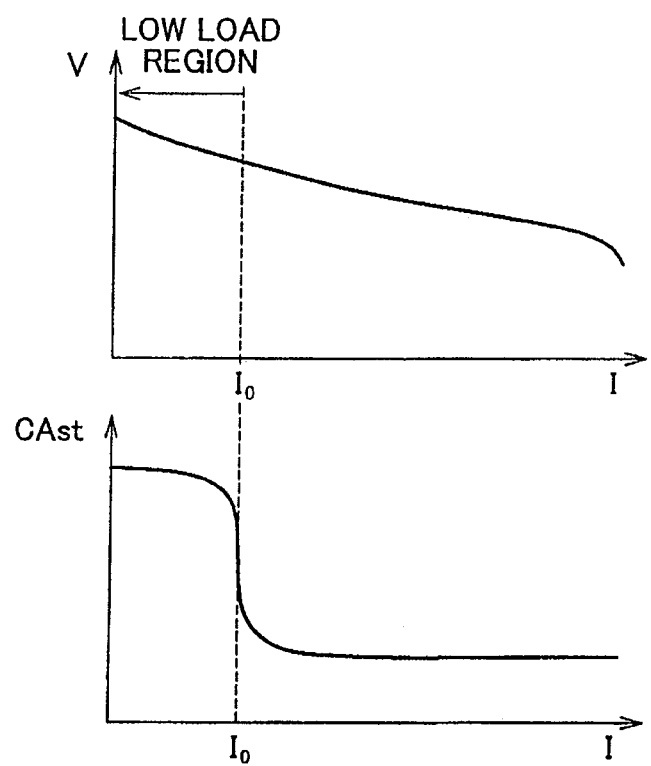
FIG. 4 are graphs representing the I-V characteristic of the fuel cell unit and the characteristic of the cathode stoichiometric value with respect to the output current of the fuel cell unit, respectively.

After the start of the control routine shown in FIG. 3, the ECU 50 first determines whether the fuel cell unit 2 is now operating in a predetermined low load region in step S100. The load on the fuel cell unit 2 is determined from the output current of the fuel cell unit 2. The output current of the fuel cell unit 2 is measured using a current meter, which is not shown in the drawings. Alternatively, the current required to be output from the fuel cell unit 2 may be determined from the electric load on the motor, etc. The upper graph in FIG. 4 illustrates the I-V characteristic of the fuel cell unit 2. As indicated in this graph, low load region is set to the region where the output current value I is smaller than a reference value $I_0$.

The larger the output current value I, that is, the higher the load on the fuel cell unit 2, the larger the amount of water generated by the power generation reactions in the fuel cell unit 2. In contrast, in a low load region where the output current value I is small, the amount of water generated by the power generation reactions is relatively small, and as shown in the lower graph in FIG. 4, the ratio of the flow rate of the cathode gas to the output current value I (will be referred to as "cathode stoichiometric value CAst") is relatively large. As a result, the amount of the water that moves from the cathode-gas passage portion 46 to the anode-gas passage portion 48 decreases, and thus the possibility of drying of the anode increases. Note that the reference value $I_0$ is set to a level at or around which the cathode stoichiometric value CAst sharply changes.

If it is determined in step S100 that the fuel cell unit 2 is not presently operating in the low load region, the ECU 50 then executes the process of step S106 so that the circulation pump 32 remains off. In this case, therefore, with the circulation pump 32 off and the discharge valve 14 is closed, the anode-dead-end operation is performed in the fuel cell system.

On the other hand, if it is determined in step S100 that the fuel cell unit 2 is presently operating in the low load region, the ECU 50 proceeds to step S102 and determines whether an anode purge is being executed. The anode purge is a process in which the discharge valve 14 is opened to discharge the anode gas from the anode-gas passage portion 48. Nitrogen enters the anode-gas passage portion 48 from the cathode-gas passage portion 46 through the membrane-electrode assembly 40 and accumulates in the anode-gas passage portion 48, and such nitrogen is expelled together with the anode gas during the anode purge, thus preventing excessive accumulation of nitrogen, which may otherwise cause various problems including a voltage drop.

Figure 5A:
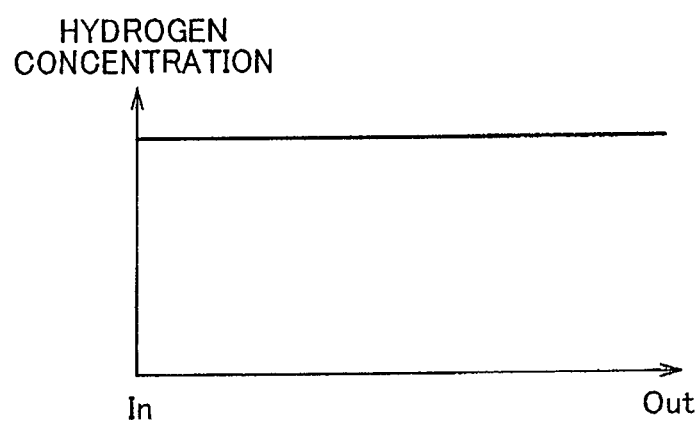
FIG. 5A is a schematic view of the distribution of the hydrogen concentration in the anode-gas passage portion when the circulation pump is on, and FIG. 5B is a schematic view of the distribution of the hydrogen concentration in the anode-gas passage portion when the circulation pump is off.
Figure 5B:
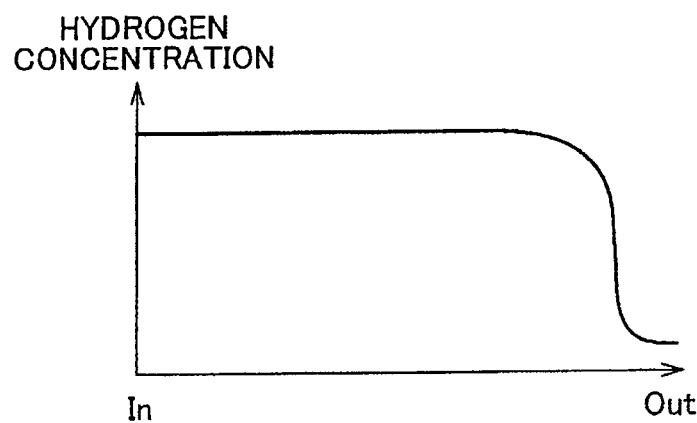

FIG. 5A is schematic view of the distribution of the hydrogen concentration in the anode-gas passage portion 48 when the circulation pump 32 is on and FIG. 5B is a view schematically showing the distribution of the hydrogen concentration in the anode-gas passage portion 48 when the circulation pump 32 is off. When the circulation pump 32 is on, nitrogen is dispersed in the anode gas as the anode gas is circulated. Thus, when the circulation pump 32 is on, the hydrogen concentration in the anode-gas passage portion 48 tends to be distributed as shown in FIG. 5A. On the other hand, if the circulation pump 32 is off, the anode gas substantially does not flow in the anode-gas passage portion 48 and therefore nitrogen accumulates in the downstream portion of the anode-gas passage portion 48. Thus, when the circulation pump 32 is off, the hydrogen concentration tends to be distributed as shown in FIG. 5B. In view of the efficiency in expelling nitrogen while avoiding unnecessary discharge of hydrogen, the hydrogen concentration distribution shown in FIG. 5B is preferred.

For the reason described above, if it is determined in step S102 that the anode purge is being executed, the ECU 50 executes the process of step S106, so that the circulation pump 32 remains off. In this manner, it is possible to prevent a decrease in the efficiency in expelling nitrogen, which may be caused when the hydrogen concentration is uniform due to the circulation of the anode gas.

If it is determined in step S102 that the anode purge is not being executed, the ECU 50 executes the process of step S104, so that the circulation pump 32 is activated. As such, the circulation pump 32 causes the anode gas in the anode-gas passage portion 48 to flow, so that water is dispersed throughout the anode together with the anode gas. According to this control, it is possible to prevent partial drying of the anode of each fuel cell even when the fuel cell unit 2 is operating in a low load region where the anode of each fuel cell tends to be dried easily. Further, because, after passing through the anode-gas passage portion 48, the anode gas is circulated back to the anode-gas passage portion 48, the anode gas is not wasted, and the water taken away from the anode-gas passage portion 48 may be returned to the anode-gas passage portion 48 together with the anode gas.

As such, even when the fuel cell unit 2 is operating in a low load region, by turning the circulation pump 32 on and off according to the control routine described above, it is possible to prevent partial drying of the anode of each fuel cell, which may otherwise deteriorate the power generation performance of the fuel cell unit 2 and reduce the durability of the electrolyte membrane.

The fuel cell system according to the second example embodiment of the invention differs from the fuel cell system of the first example embodiment in the control for turning the circulation pump 32 on and off. The fuel cell system of the second example embodiment is configured as shown in FIG. 1, FIG. 2A, and FIG. 2B, and the ECU 50 executes the control routine illustrated by the flowchart of FIG. 6 according to which the circulation pump 32 is turned on and off. In the control routine shown in FIG. 6, the processes identical to those of the control routine shown in FIG. 3 are denoted using the same step numbers. In the following, only the processes specific to the fuel cell system of the second example embodiment will be described in detail, and the processes identical to those of the first example embodiment will be described only briefly or will not be described.

Figure 6:
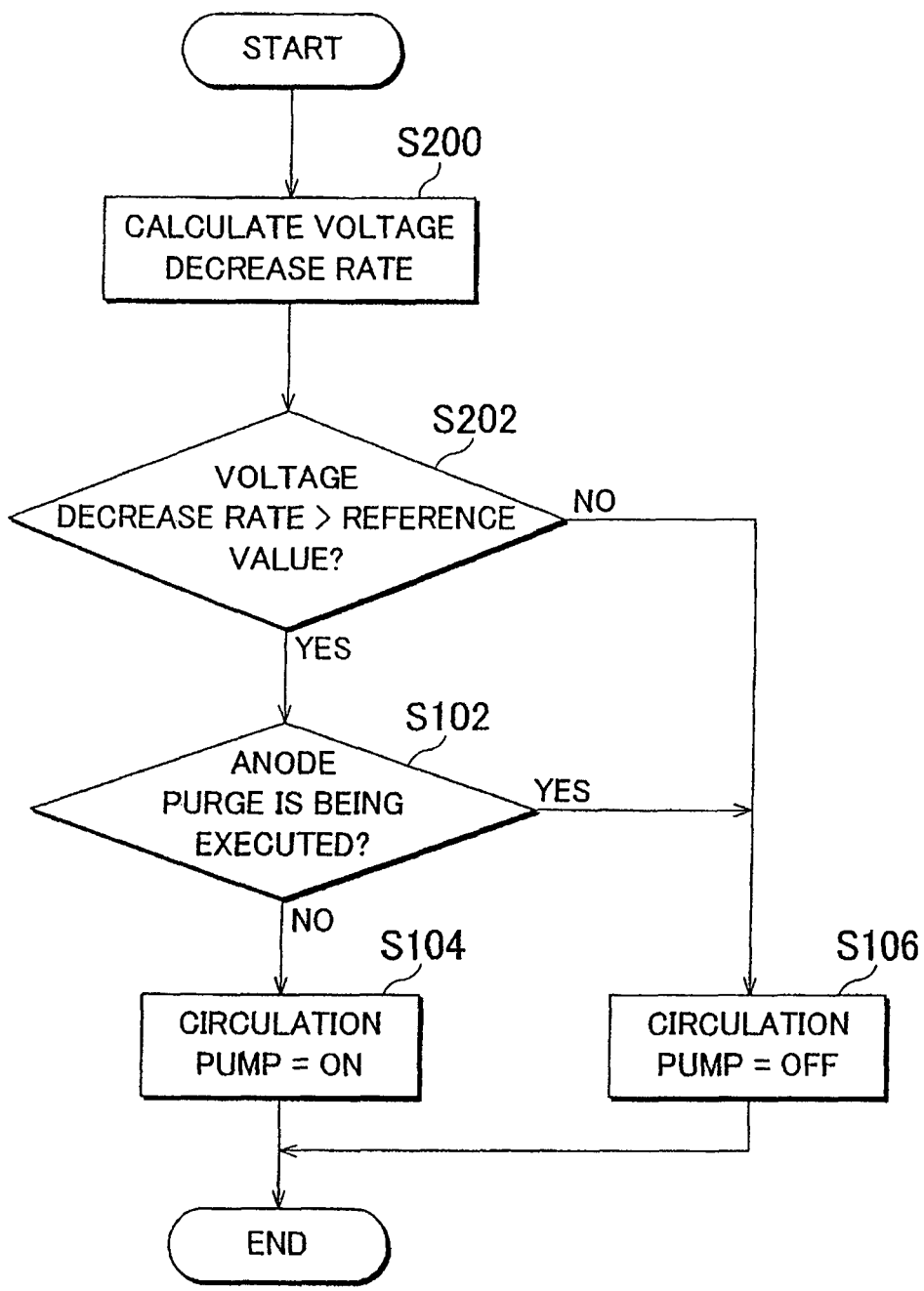
FIG. 6 is a flowchart illustrating a control routine that is executed in the fuel cell system of the second example embodiment to turn the circulation pump on and off.
Figure 7:
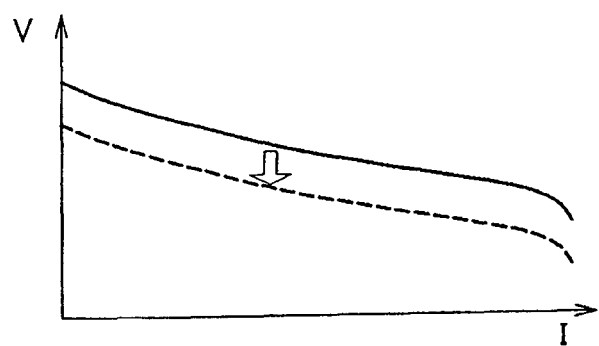
FIG. 7 is a graph representing the I-V characteristic of the fuel cell unit 2 obtained when the fuel cell unit 2 is properly moistened and the I-V characteristic of the fuel cell unit 2 obtained when the anode is dried.

After the start of the control routine shown in FIG. 6, the ECU 50 first calculates the rate of decrease in the voltage of the fuel cell unit 2 in step S200. FIG. 7 illustrates the I-V characteristic of the fuel cell unit 2. In the FIG. 7, the I-V characteristic obtained when the fuel cell unit 2 is adequately hydrated is indicated by the solid curve, while the I-V characteristic obtained when the anode is insufficiently hydrated is indicated by the dotted line. As indicated in FIG. 7, the output voltage of the fuel cell unit 2 decreases as the degree of hydration of the anode of each fuel cell decreases. Furthermore, the output voltage of the fuel cell unit 2 decreases at a higher rate as more of the anode of each fuel cell becomes insufficiently hydrated. As such, the rate of decrease in the voltage of the fuel cell unit 2 (1−the present voltage/the voltage obtained when the fuel cell unit 2 is properly moistened ×100) may be used a physical quantity related to the degree of hydration of the anode of each fuel cell, and therefore the degree of hydration of the anode may be expressed in a value by calculating the rate of decrease in the voltage of the fuel cell unit 2.

Subsequently, in step S202, the ECU 50 compares the voltage decrease rate calculated in step S200 with a predetermined reference value. That is, in this step, the ECU 50 determines whether the voltage decrease rate exceeds the reference value. When the anode of each fuel cell is insufficiently hydrated, that is, when the voltage decrease rate is exceeds the reference value, it is necessary to recover the anode from the dried state as well as preventing the anode from being further dried. That is, the reference value is the value based on which it is determined whether the process for rehydrating the anode of each fuel cell from the dried state is to be executed. In other words, the reference value is used to determine, whether the anode gas is to be circulated using the circulation pump 32.

If it is determined in step S202 that the voltage decrease rate is equal to or below the reference value, the ECU 50 executes the process of step S106, so that the circulation pump 32 remains off. In this case, therefore, the anode-dead-end operation is performed in the fuel cell system.

On the other hand, if it is determined in step 202 that the voltage decrease rate exceeds the reference value, the ECU 50 then proceeds to step S102 and determines whether the anode purge is being executed. If the anode purge is being executed, the ECU 50 executes the process of step S106, so that the circulation pump 32 remains off.

On the other hand, if it is determined in step S102 that the anode purge is not being executed, the ECU 50 executes the process of step S104, so that the circulation pump 32 is turned on. As such, the circulation pump 32 causes the anode gas in the anode-gas passage portion 48 to flow, so that water is dispersed throughout the anode of each fuel cell together with the anode gas.

As such, even if the anode is insufficiently hydrated due to the anode-dead-end operation, by turning the circulation pump 32 on and off according to the control routine described above, it is possible to rehydrate the anode of each fuel cell promptly as well as preventing the anode from being further dried. Thus, it is possible to prevent deterioration of the power generation performance of the fuel cell unit 2 and reduction of the durability of the electrolyte membrane of each fuel cell, which may otherwise be caused by drying of the anode of each fuel cell.

The fuel cell system according to the third example embodiment of the invention is the same as the fuel cell system of the second example embodiment except that, during execution of the control for turning the circulation pump 32 on and off, the degree of hydration of the anode of each fuel cell is determined in the method described below.

Figure 8:
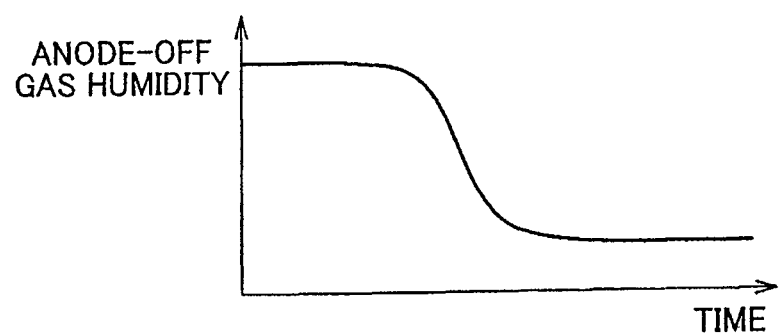
FIG. 8 is a graph representing how the humidity of the anode-off gas changes as the anode-dead-end operation continues.

When a portion of the anode of a fuel cell of the fuel cell unit 2 is insufficiently hydrated, that portion absorbs the moisture contained in the anode gas, so that the humidity of the anode gas that has passed through the anode-gas passage portion 48 (anode-off gas) decreases accordingly. FIG. 8 illustrates how the humidity of the anode-off gas changes as the anode-dead-end operation continues. Referring to FIG. 8, the humidity of the anode-off gas decreases gradually as the hydration of the anode decreases during the anode-dead-end operation. As such, the humidity of the anode-off gas may be used as a physical quantity related to the degree of hydration of the anode, and the degree of hydration of the anode may be precisely determined by measuring the humidity of the anode-off gas.

In the fuel cell system of the third example embodiment, a hygrometer H or a dew-point meter is provided in the anode-gas discharge passage 12 to detect the humidity of the anode-off gas, and the circulation pump 32 is turned on and off based on the result of the comparison between the detected humidity and a predetermined reference value. More specifically, although a flowchart for this control is not included in the drawings, if the detected humidity is equal to or below the reference value, the circulation pump 32 is maintained in the stopped state, and if the detected humidity exceeds the reference value and the anode purge is not being executed, the circulation pump 32 is activated. By turning the circulation pump 32 on and off in this manner, even if the anode is insufficiently hydrated due to the anode-dead-end operation, the anode of each fuel cell can be prevented from being further dried and can be promptly rehydrated.

The fuel cell system according to the fourth example embodiment of the invention is the same as the fuel cell system of the second example embodiment except that, during execution of the control for turning the circulation pump 32 on and off, the degree of hydration of the anode is determined in the method described below.

Figure 9:
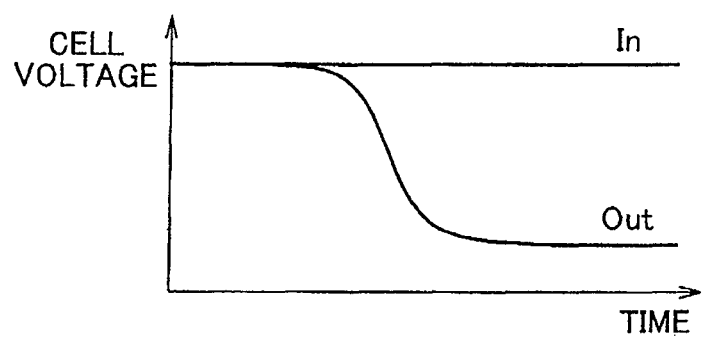
FIG. 9 is a graph representing how the cell voltage at the inlet portion of the anode-gas passage portion and the cell voltage at the outlet portion of the anode-gas passage portion change in time during the anode-dead-end operation.

During the anode-dead-end operation, the drying of the anode is more likely to occur at a position corresponding to the upstream portion of the anode-gas passage portion 48 than at a position corresponding to the downstream portion of the anode-gas passage portion 48. The internal resistance at the dried portion of the anode is relatively high, which causes a decrease in the voltage. FIG. 9 illustrates how the cell voltage at the inlet portion of the anode-gas passage portion 48 (In) and the cell voltage at the outlet portion of the anode-gas passage portion 48 (Out) change in time during the anode-dead-end operation. Referring to FIG. 9, the difference between the voltage at the inlet portion and the voltage at the outlet portion increases as the hydration of the anode decreases while the anode-dead-end operation continues. As such, the voltage difference between the inlet portion and the outlet portion of the anode-gas passage portion 48 may be used as a physical quantity related to the degree of hydration of the anode, and therefore the degree of hydration of the anode may be precisely determined by detecting the voltage difference.

In the fuel cell system of the fourth example embodiment, voltage monitors V1 and V2 are provided at the inlet portion and the outlet portion of the anode-gas passage portion 48, respectively, and the voltage difference between the inlet potion and the outlet portion is detected using the voltage monitors V1 and V2, and the circulation pump 32 is turned, on and off based on the result of the comparison between the detected voltage difference and a predetermined reference value. More specifically, although a flowchart for this control is not included in the drawings, if the detected voltage difference is equal to or below the reference value, the circulation pump 32 is remains off, and if the detected voltage difference is exceeds the reference value and the anode purge is not being executed, the circulation pump 32 is activated. Thus, by turning on and off the circulation pump 32 in this manner, even if the anode is insufficiently hydrated due to the anode-dead-end operation, it is possible to prevent the anode from being further dehydrated and be promptly rehydrated.

The fuel cell system of the fifth example embodiment is the same as the fuel cell systems of the first to fourth example embodiments except that the following coolant flow-rate control is executed together with the control for turning the circulation pump 32 on and off.

Figure 10:
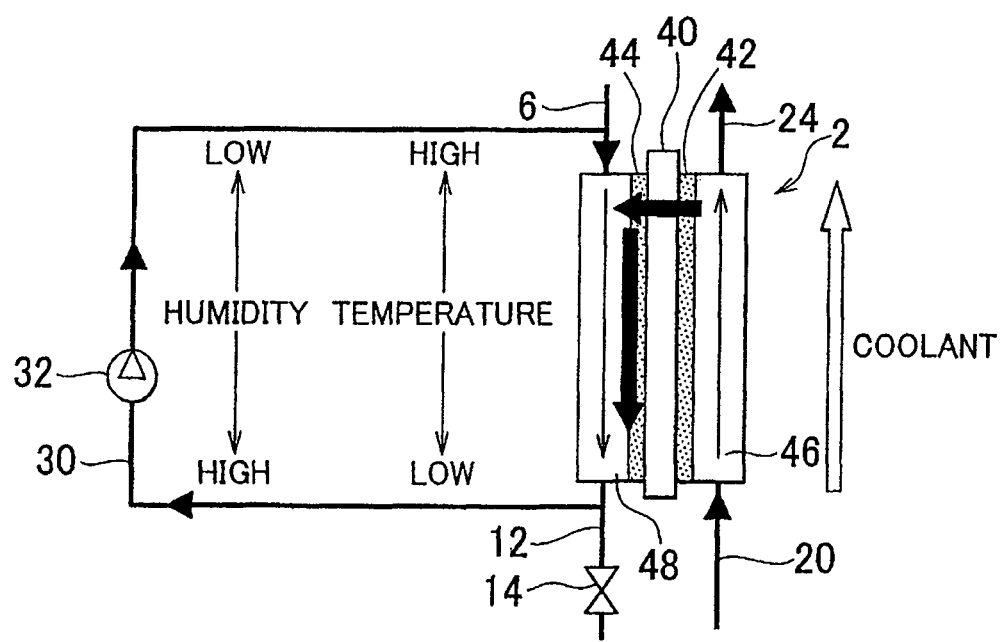

FIG. 10 illustrates how the respective gases and the coolant flow in each fuel cell when the circulation pump 32 is on. The coolant flows in a coolant passage (not shown) that is formed between the fuel cells adjacent to each other. As is shown in FIG. 10, the coolant flows from the inlet side of the cathode-gas passage portion 46 to the outlet side of the cathode-gas passage portion 46, in other words, from the outlet side of the anode-gas passage portion 48 to the inlet side of the anode-gas passage portion 48.

According to the coolant flow direction indicated in FIG. 10, the temperature of the anode gas at the outlet side of the anode-gas passage portion 48 becomes lower than the temperature of the anode gas at the inlet side of the anode-gas passage portion 48. The temperature difference is decided by the flow rate of the coolant. In the fifth example embodiment, when the circulation pump 32 is on, the flow rate of the coolant is controlled such that the temperature difference between the inlet side and the outlet side of the anode-gas passage portion 48 is larger than it is when the circulation pump 32 is off (i.e., the flow rate of the coolant is increased). That is, by thus increasing the temperature difference between the inlet side and the outlet side of the anode-gas passage portion 48, the humidity difference between the inlet side and the outlet side of the anode-gas passage portion 48 may be increased. More specifically, if the humidity at the inlet side of the anode-gas passage portion 48 is made relatively low, it helps the anode gas bring water away. On the other hand, if the humidity at the outlet side of the anode-gas passage portion 48 is made relatively high, it helps moisten the dried portions of the anode. Thus, by controlling the flow rate of the coolant as well as the turning-on/off of the circulation pump 32, it is possible to more effectively prevent deterioration of the power generation performance of the fuel cell unit 2 and reduction of the durability of the electrolyte membrane of each fuel cell, which may otherwise be caused by drying of the anode of each fuel cell.

The fuel cell system of the sixth example embodiment is the same as the fuel cell systems of the first to fifth example embodiments except that the following anode-gas-pressure control is executed as well as the control for turning the circulation pump 32 on and off.

According to the configuration shown in FIG. 1, when the anode gas is being circulated by the circulation pump 32, the gas pressure in the circulation passage may be adjusted using the variable pressure adjustment valve 8. In the sixth example embodiment, when the circulation pump 32 is on, the variable pressure adjustment valve 8 is controlled such that the pressure of the anode gas is lower than it is when the circulation pump 32 is off. Assuming that the capacity of the circulation pump 32 is unchanged, the flow rate of the anode gas can be increased by increasing its pressure. If the flow rate of the anode gas flowing in the anode-gas passage portion 48 has been thus increased, it helps the anode gas bring water, so that the water is dispersed more efficiently. Further, if the pressure of the anode gas is reduced, it facilitates the movement of water from the cathode side to the anode side. As such, by controlling the pressure of the anode gas as well as the turning-on/off of the circulation pump 32, it is possible to more effectively prevent deterioration of the power generation performance of the fuel cell unit 2 and reduction of the durability of the electrolyte membrane of each fuel cell, which may otherwise be caused by drying of the anode of each fuel cell.

While the invention has been described with reference to the example embodiments thereof, it is to be understood that the invention is not limited to any of these example embodiments. To the contrary, the invention is intended to cover various modifications and equivalent arrangements within the scope of the invention, including those described below.

While the circulation pump 32 is provided in the communication passage 30 in the fuel cell system shown in FIG. 1, an ejector and a valve may be provided in place of the circulation pump 32. More specifically, the ejector may be provided at the point at which the hydrogen-supply passage 6 and the communication passage 30 converge, and the valve may be provided in the communication passage 30. In this case, the valve may be regarded as corresponding to "communication-state switching means" of the invention, and the ejector may be regarded as corresponding to "gas-flowing means". Further, a fuel cell system according to the invention may be such that valves are provided at the point at which the hydrogen-supply passage 6 and the communication passage 30 converge and at the point at which the anode-gas discharge passage 12 and the communication passage 30 converge, respectively, and a pump or an ejector is provided in the communication passage 30.

Further, while the gas flow direction in the cathode-gas passage portion 46 and the gas flow direction in the anode-gas passage portion 48 are opposite to each other in the fuel cell structures shown in FIG. 2A and FIG. 2, the invention may be applied also to a fuel cell system incorporating a fuel cell structure in which the anode gas and the cathode gas flow in the same direction. In the case where the anode gas and the cathode gas flow in the same direction, the drying of the anode progresses at the inlet side of the anode gas passage, and the anode gas receives water at the outlet side of the anode gas passage. Even in such a case, the water received from the anode gas at the outlet side may be brought to the inlet side by circulating the anode gas, so that the dried portions at the inlet side are hydrated.

While the dead-end operation in which the discharge valve 14 is fully closed is the standard operation of the fuel cell system in the foregoing example embodiments, the operation in which the discharge valve 14 is slightly opened ("continuous low-rate-discharge operation") may alternatively be performed as the standard operation of the fuel cell system. During the continuous low-rate-discharge operation, the degree of opening of the discharge valve 14 is adjusted such that the flow rate of the anode gas expelled is extremely low as compared to the amount of the anode gas consumed in the anode-gas passage portion 48. According to this continuous low-rate-discharge operation, the nitrogen stagnating in the anode-gas passage portion 48 is gradually expelled, and therefore the frequency of the anode purge may be decreased as compared to during the anode-dead-end operation.

While the circulation of the anode gas is completely stopped during the anode purge in the routines illustrated in FIG. 3 and FIG. 6, these routines may alternatively be such that, during the anode purge, the circulation amount of the anode gas is reduced relative to when the anode purge is not being performed. Further, when the anode of each fuel cell has already been dried to a large extent, the circulation of the anode gas may be performed even during the anode purge, giving a priority to preventing the anode from being further dried and rehydrating the anode.

While the anode gas is circulated when the fuel cell unit 2 is operating in the low load region in the first example embodiment, preferably, the anode gas is circulated also when the fuel cell unit is operating under a load higher than the normal load range. If the fuel cell unit operates under a high load without circulating the anode gas, anode gas deficiencies may occur at some portions in the downstream side of the anode gas passage in each fuel cell, and it may degrade the catalysts at said portions. In view of this, the anode gas is circulated also when the load on the fuel cell unit is high, so that the nitrogen accumulated in the anode gas passage in the fuel cell is dispersed and local anode gas deficiencies are prevented. Note that the above-described control for tuning the circulation pump 32 on and off in a high load region may be applied to any of the fuel cell systems of the first to sixth example embodiments described above.

Further, in the fuel cell systems of the second to fourth example embodiments, the operating temperature of the fuel cell unit 2 may be detected, and the detected operating temperature may be referenced when determining the degree of hydration of the anode of each fuel cell. That is, whether the anode has been dried may be determined more accurately by taking the operating temperature of the fuel cell unit 2 into consideration.

Further, the invention may be applied also to a fuel cell system that operates the gas-discharge valve only for an emergency case (purgeless dead-end type system). In this system, because purge is not performed using the gas-discharge valve, the partial pressure of nitrogen in the anode gas passage increases during the operation of the fuel cell system. However, when the nitrogen partial pressure in the anode gas passage is equal to the nitrogen partial pressure in the cathode passage, the nitrogen partial pressure in the anode gas passage does not increase any more. That is, in such a purgeless dead-end system, a certain amount of nitrogen is allowed to accumulate in the anode gas passage in each fuel cell.

In the above-embodiments, it is determined whether the power generation state of the fuel cell is abnormal or whether the power generation state of the fuel cell will become abnormal based on the physical quantity related to the degree of hydration of an anode of the fuel cell or the load on the fuel cell. Therefore, it is possible to prevent the power generation state of the fuel cell from becoming abnormal, or to quickly make the power generation state of the fuel cell normal even if the power generation state of the fuel cell is abnormal.

The invention claimed is:

1. A fuel cell system comprising:
   a fuel cell;
   a gas-supply passage via which anode gas is supplied to the fuel cell;
   a gas-discharge passage via which anode gas is discharged from the fuel cell, the gas-discharge passage having an end which is substantially closed and configured to expel the anode gas discharged from the fuel cell at a very low rate that prevents deterioration of a power generation performance of the fuel cell system;
   a communication passage via which the gas-discharge passage communicates with the gas-supply passage;
   an interrupting device having a single pump or a single set of an ejector and a valve provided in the communication passage and operable to interrupt the flow of anode gas to control a degree of hydration of the fuel cell; and
   a controller programmed to:
      normally maintain the communication passage in a closed state using the single pump or the single set of the ejector and the valve,
      determine whether a predetermined condition related to the operation state of the fuel cell is satisfied,
      control the single pump or the single set of the ejector and the valve so as to place the communication passage in an opened state if the predetermined condition is satisfied,
      determine whether the load on the fuel cell is below a first reference load,
      when the load on the fuel cell is below the first reference load, determine that the predetermined condition is satisfied and operate the single pump or the single set of the ejector and the valve to open the communication passage, and
      control the single pump or the single set of the ejector and the valve to close the communication passage if it is determined that the load of the fuel cell is equal to or greater than the first reference load.

2. The fuel cell system according to claim 1, wherein the controller is programmed to determine that the load on the fuel cell is below the first reference load when an output current of the fuel cell is equal to or below a reference value.

3. The fuel cell system according to claim 1, wherein the controller is programmed to:
   determine whether the load on the fuel cell is presently higher than a second reference load, wherein the second reference load is higher than the first reference load; and
   if the load on the fuel cell is presently higher than the second reference load, determine that the predetermined condition is satisfied and open the communication passage.

4. A fuel cell system comprising:
   a fuel cell;
   a gas-supply passage via which anode gas is supplied to the fuel cell;
   a gas-discharge passage via which anode gas is discharged from the fuel cell, the gas-discharge passage having an end which is substantially closed and configured to expel the anode gas discharged from the fuel cell at a very low rate that prevents deterioration of a power generation performance of the fuel cell system;
   a communication passage via which the gas-discharge passage communicates with the gas-supply passage;
   an interrupting device having a single pump or a single set of the ejector and the valve provided in the communication passage and operable to interrupt the flow of anode gas to control a degree of hydration of an anode of the fuel cell; and
   a controller programmed to:
      normally maintain the communication passage in a closed state using the single pump or the single set of the ejector and the valve,
      determine whether a predetermined condition related to the operation state of the fuel cell is satisfied,
      control the single pump or the single set of the ejector and the valve so as to place the communication passage in an opened state if the predetermined condition is satisfied,
      measure or calculate a physical quantity related to the degree of hydration of the anode of the fuel cell,
      determine whether the measured or calculated physical quantity that indicates that the degree of hydration of the anode is higher than a reference value,
      operate the single pump or the single set of the ejector and the valve to open the communication passage if the measured or calculated physical quantity indicates that the degree of hydration of the anode is below the reference value, and
      control the single pump or the single set of the ejector and the valve to close the communication passage if it is determined that the degree of hydration is equal to or greater than the reference value.

5. The fuel cell system according to claim 4, wherein:
the physical quantity is a rate of decrease in the voltage of the fuel cell; and
the controller is programmed to measure the rate of decrease in the voltage of the fuel cell.

6. The fuel cell system according to claim 4, wherein:
the physical quantity is the humidity of the anode gas in the gas-discharge passage; and
the controller is programmed to measure the humidity of the anode gas in the gas-discharge passage.

7. The fuel cell system according to claim 4, wherein:
the physical quantity is the difference between the voltage at the inlet side of the anode of the fuel cell and the voltage at the outlet side of the anode of the fuel cell; and
the controller is programmed to measure the difference between the voltage at the inlet side of the anode of the fuel cell and the voltage at the outlet side of the anode of the fuel cell.

8. The fuel cell system according to claim 4, wherein:
the physical quantity is the operating temperature of the fuel cell; and
the controller is programmed to measure the operating temperature of the fuel cell.

9. The fuel cell system according to claim 4, wherein the fuel cell includes a first gas passage portion and a second gas passage portion, wherein the first gas passage portion is configured to allow gas to flow in a direction at the anode of the fuel cell that is the opposite of a gas flow direction through the second gas passage portion at a cathode of the fuel cell.

10. The fuel cell system according to claim 4, further comprising:
a gas-discharge valve provided in the gas-discharge passage and operable to interrupt or limit a communication between the upstream side and the downstream side of the gas-discharge valve,
wherein the controller is programmed to maintain the communication passage in the closed state or limit the gas flow in the communication passage when the gas-discharge valve is neither interrupting nor limiting the communication between the upstream side and the downstream side of the gas-discharge valve.

11. The fuel cell system according to claim 4, wherein the controller is programmed to reduce the pressure of anode gas supplied to the fuel cell when the communication passage is open.

12. The fuel cell system according to claim 4, wherein the fuel cell has a coolant passage via which coolant is circulated.

13. The fuel cell system according to claim 12, wherein the coolant passage is provided in the anode side of the fuel cell and the flow direction of the coolant is opposite to the flow direction of the anode gas.

14. The fuel cell system according to claim 12, wherein the controller is programmed to control the flow rate of the coolant so that the temperature at the outlet side of the anode is lower than the temperature at the inlet side of the anode by a larger amount when the communication passage is in the opened state than when the communication passage is in the closed state.

15. The fuel cell system according to claim 14, wherein the controller is programmed such that when the communication passage is open, the controller increases the flow rate of the coolant.

16. The fuel cell system according to claim 1, wherein the controller is programmed to determine that the predetermined condition is satisfied and operate the pump to close the communication passage when the load on the fuel cell is equal to or greater than the first reference load.

17. The fuel cell system according to claim 4, wherein the controller is programmed to operate the pump to close the communication passage if the measured or calculated physical quantity indicates that the degree of hydration of the anode is equal to or greater than the reference value.

* * * * *